US009117329B2

(12) United States Patent
Osgood et al.

(10) Patent No.: US 9,117,329 B2

(45) Date of Patent: Aug. 25, 2015

(54) GAMING SYSTEM FOR DATA MANAGEMENT AND COLLECTION AND RELATED METHODS

(75) Inventors: Paul R. Osgood, Reno, NV (US); James W. Morrow, Sparks, NV (US); Carmen DiMichele, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1214 days.

(21) Appl. No.: 11/225,495

(22) Filed: Sep. 12, 2005

(65) Prior Publication Data

US 2007/0060364 A1 Mar. 15, 2007

(51) Int. Cl.

| | |
|---|---|
| ***A63F 9/24*** | (2006.01) |
| ***A63F 13/00*** | (2014.01) |
| ***G07F 17/00*** | (2006.01) |
| ***G07F 19/00*** | (2006.01) |
| ***G07F 17/32*** | (2006.01) |

(52) U.S. Cl.

CPC ............ *G07F 17/32* (2013.01); *G07F 17/3232* (2013.01)

(58) Field of Classification Search

CPC ............ G07F 17/3202; G07F 17/3234; G07F 17/3241

USPC ....................................... 463/42, 29; 709/224

See application file for complete search history.

(56) References Cited

U.S. PATENT DOCUMENTS

| | | | | |
|---|---|---|---|---|
| 6,875,110 | B1 * | 4/2005 | Crumby | 463/42 |
| 2004/0048671 | A1 * | 3/2004 | Rowe | 463/42 |
| 2004/0229684 | A1 * | 11/2004 | Blackburn et al. | 463/29 |
| 2005/0113172 | A1 | 5/2005 | Gong | |
| 2005/0192099 | A1 | 9/2005 | Nguyen et al. | |
| 2006/0195567 | A1 * | 8/2006 | Mody et al. | 709/224 |
| 2007/0197294 | A1 * | 8/2007 | Gong | 463/42 |

* cited by examiner

*Primary Examiner* — Milap Shah

*Assistant Examiner* — Jason Pinheiro

(74) *Attorney, Agent, or Firm* — Marvin A. Hein; Philip J. Anderson

(57) ABSTRACT

Systems for managing gaming devices in a networked environment are disclosed herein. The system includes one or more gaming device, at least one data repository, host system, and a datastore. The gaming devices have a gaming processor and a plurality of gaming components, wherein one or more parameters are associated with the gaming components. The data repository is in communication with the one or more gaming components, and the data repository stores data that includes one or more parameters from each gaming component. A host system is in communication with the gaming devices, and the host system is configured to collect data from the data repository. The host system also includes a datastore in communication with the host system, wherein the datastore stores data from the gaming devices.

12 Claims, 5 Drawing Sheets

GAMING SYSTEM FOR DATA MANAGEMENT AND COLLECTION AND RELATED METHODS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments disclosed herein relate generally to gaming systems for data management and collection and related methods.

BACKGROUND

Traditionally, gaming machines have been designed for gaming purposes only. In this regard, gaming machines have been constructed only to include gaming functionality. Recently, however, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits. In order to maintain a player's attention, casinos need to gather as much information as possible regarding the players and the games they are playing.

Attempts to distribute gambling-related information and advertisements to players has typically required additional system components to be attached to the gaming devices separately and apart from the construction of the gaming machine itself. Such components have generally included a keypad, card reader, and display equipment, such as a 2-line LED display. As a result, the gaming machines have grown in sophistication and number of components.

While gaming machines have increased in sophistication, casino operators need to obtain a greater amount of information from gaming devices. That is, the casino operator needs to track the traditional functions of the gaming devices in addition to various qualities and/or parameters of the new components that provide expanded service and system capabilities. Obtaining the required information from each gaming machine may be a time-consuming process. Furthermore, compatibility issues may prevent a network system from obtaining the required information from each component in the gaming device. Accordingly, there remains a need for a system for managing gaming devices in a networked environment.

SUMMARY

Briefly, and in general terms, various embodiments are directed to a gaming system for data management and collection. The system includes one or more gaming machines in a network of gaming machines. The gaming machines include a game data repository that stores data relating to various aspects of gaming machine components. As a result, the system is able to query a single device in a gaming machine to obtain all the desired game device data from the entire gaming machine. This game device data may be periodically collected from each gaming machine within the network system and stored within a datastore. The datastore records may then be accessed by other components within the network for data analysis. Accordingly, the records of all the gaming machines within the networked environment may be rapidly updated thereby ensuring up-to-date data. Furthermore, the system is cost-effective and accurate as human record keeping is minimized.

In one embodiment, a system for managing gaming devices in a networked environment includes at least one gaming device, a host system, and a datastore. The gaming device comprises a gaming processor, a plurality of gaming components having one or more parameters, and a data repository. The data repository is in communication with the plurality of gaming components of the gaming device. The data repository stores data that includes one or more parameters from each gaming component. A host system is in communication with the data repository and is configured to data from the data repository. A datastore, which is in communication with the host system, stores the data from at least one gaming device. In another embodiment, the system includes a data repository that is a component separate from the gaming machine.

In yet another embodiment, the system for managing gaming devices in a networked environment includes a plurality of gaming machines, a host system, and a datastore. The gaming device comprises a gaming processor, a plurality of gaming components, and a game data repository. The gaming device repository stores data from the game processor and the plurality of gaming components. The gaming device repository also queries the game processor and the game components for data. A host system includes at least one server, wherein the host system is in communication with the gaming device repository. In one embodiment, the host system further includes a datastore. According to one embodiment, the host system transfers data from the game device repository to the datastore. In another embodiment, the host system targets and transfers data from the game device repository to the datastore.

In addition to various embodiments of a data collection system, various methods of managing and collecting data are disclosed herein. According to one method, inventory data is collected from one or more components located within a gaming device. The inventory data is stored in a gaming device repository. The gaming device repository is queried for gaming device data. Alternatively, in another method, the gaming device repository is searched for gaming device data by one or more gaming parameters or other identifiable criteria. If present, at least a portion of the inventory data is transmitted to a host server. In another method, the inventory data is stored in a datastore that is in communication with the host server.

Other features and advantages will become apparent from the following detailed description, taken in conjunction with the accompanying drawings, which illustrate by way of example, the features of the various embodiments.

DETAILED DESCRIPTION

Various embodiments disclosed herein are directed to a gaming device system for data management and collection. The system includes one or more gaming machines in a network of gaming machines. The gaming machines include a game data repository that stores data relating to various aspects of gaming machine components. As a result, the system is able to query a single device in a gaming machine to obtain all the desired game device data from the entire gaming machine. The system may search the data by category or parameter and retrieve only the targeted data. Furthermore, compatibility issues between the system and the various gaming component are minimized since the game device data is located within the game data repository, which is readily accessible by the system. This game device data may be periodically collected from each gaming machine within the network system and stored within a datastore. The datastore records may then be accessed by other system components within the network for data analysis. Accordingly, the records of all the gaming machines within the networked environment may be rapidly updated thereby ensuring up-to-date data. Furthermore, the system is cost-effective and accurate as human record keeping is minimized.

As described below, an embedded additional user interface is preferably integrated into a gaming machine and acts to increase user excitement by providing a richer gaming experience. An embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some embodiments. Moreover, such a user interface is sometimes referred to as a player tracking user interface because this device often uses player-specific information to maximize its usefulness and functionality.

Figure 1:
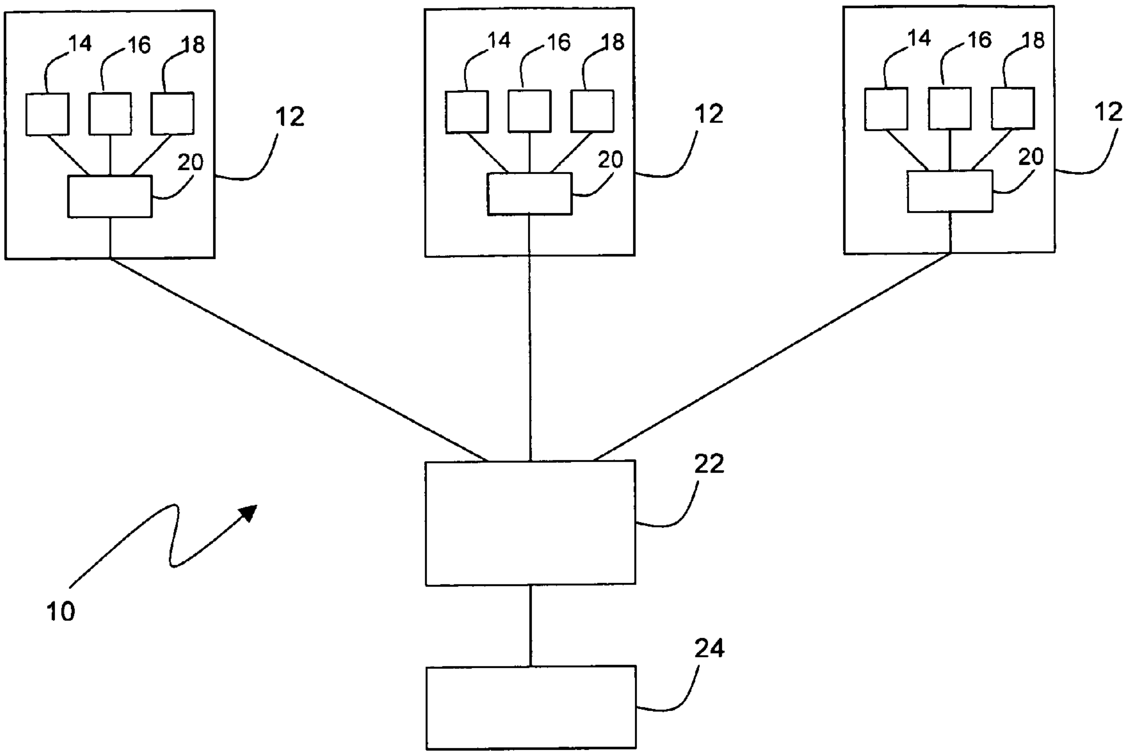
FIG. 1 is a schematic view of one embodiment of a data collection system.
Figure 2:
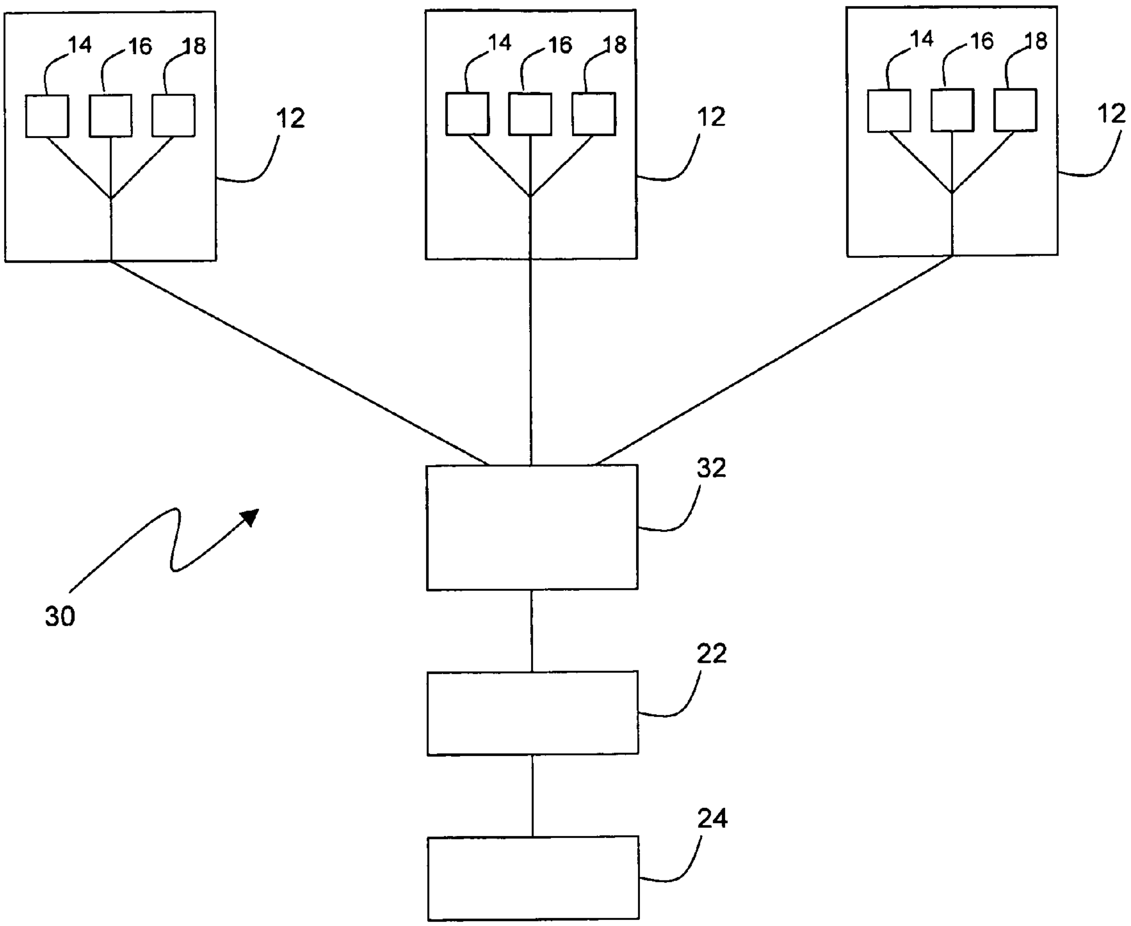
FIG. 2 is a schematic view of another embodiment of a data collection system.

Referring now to the drawings, wherein like reference numerals denote like or corresponding parts throughout the drawings and, more particularly to FIGS. 1-2, there are shown various embodiments of a system for data management and collection. More specifically, as shown in FIG. 1, the system 10 includes one or more gaming machines 12 that are networked with the system server 22 that includes a server datastore 24.

According to one embodiment, the gaming machines 12 are electronic gaming machines that may present games of chance such as, but not limited to, video slots, video keno, video poker, or Class II bingo. Alternatively, the gaming machines 12 may be mechanical slot machines. In another embodiment, the gaming machines 12 may be hybrid game having both mechanical and electronic aspects, for example reel spinning slot machines.

As shown in FIG. 1, the gaming machines 12 include a game monitoring unit (GMU) 14, a player tracking system 16, and one or more gaming machine components 18 and a game data repository 20. The gaming machine components 18 may be a bill dispenser, coin acceptor, hoppers, printers, or other embedded components. The GMU 14 is a device that is connected to the circuitry of the gaming machine 12. The GMU 14 monitors the game, coin status, player winnings, and the gaming machine itself. Accordingly, the GMU 14 is in communication with various components 16, 18 of the gaming machine 12. Alternatively, the functions of the GMU 14 may be carried out at a central location (not shown), such as a network server, and communicated to each gaming machine 12 by a local area network, wireless network, wide area network, or the like.

The player tracking system 16 generally includes a computer (or as least a processor), software, and accessories to gaming devices that allow a casino operator to identify a player, accumulate player gaming data, and reward the player accordingly. In one embodiment, the player tracking system 16 includes a card reader, a display screen, and optionally, a player interface such as a keypad. As those skilled in the art will appreciate, the computer associated with the player tracking system 16 is generally located at a site remote from the gaming machines 12. Alternatively, a computer associated with the player tracking system may be located within the gaming machine 12. Regardless of the location of the computer, the player tracking system 16 is in communication with the various player tracking accessories located in the gaming machine 12.

Figure 3:
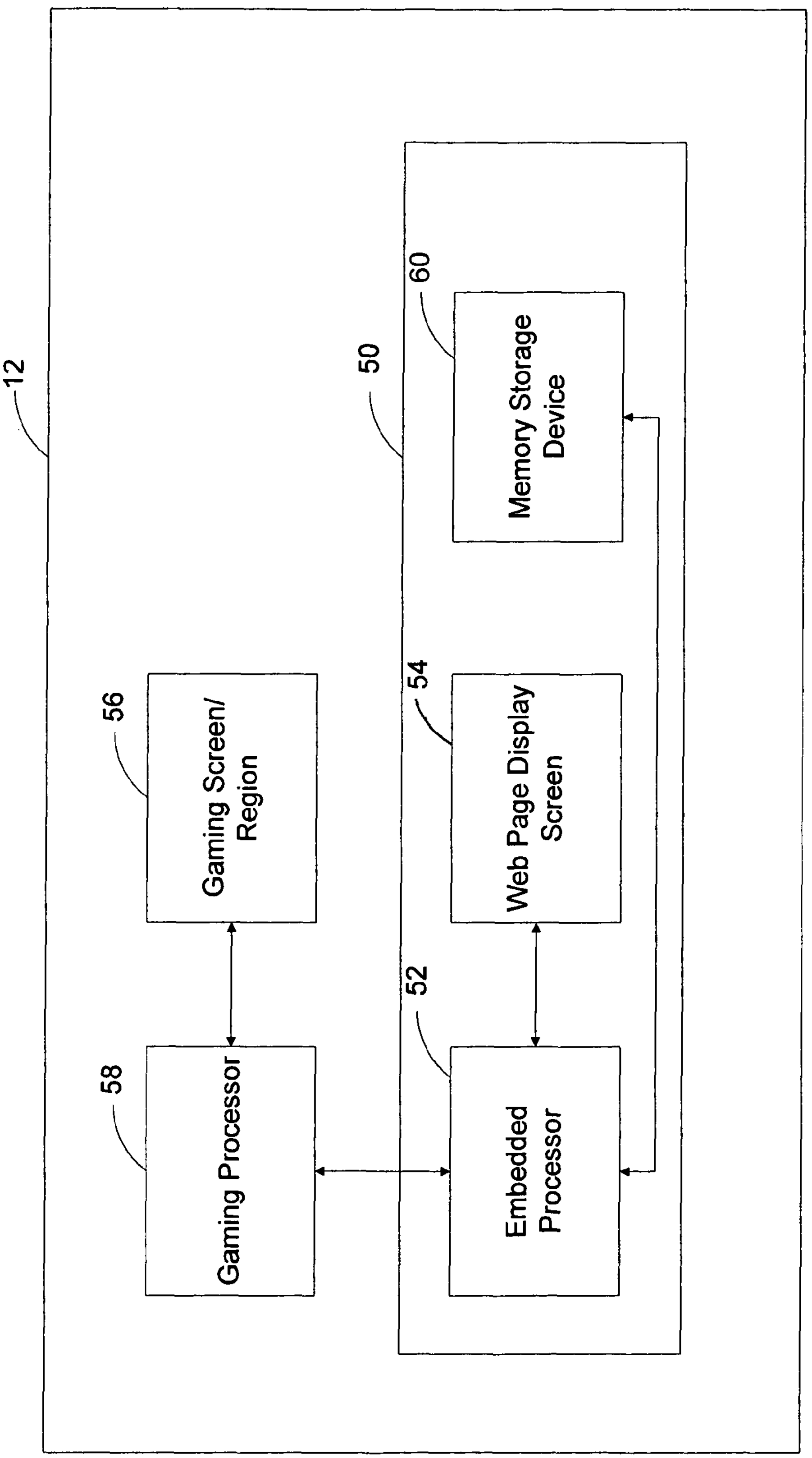
FIG. 3 is a schematic view of an embedded additional user interface that is in communication with the data collection system.

Referring now to FIG. 3, an embedded additional user interface 50 includes a web page display screen 54, an embedded processor 52, and a memory storage device 60. The user interface 50 is incorporated into a gaming machine 12 that, in turn, includes a gaming screen 56, (and/or non-screen gaming region 56, e.g., spinning reels or other gaming presentation) gaming processor 58, and a GMU (not shown). The embedded processor 52 employs an internal operating system and communicates with the gaming processor 58. The embedded processor 52 reads incoming data, translates the data into a web authoring language, and maps the data to the web page display screen 54. The display screen 54 presents web page information to a user via the display screen, thereby increasing user excitement by providing a richer gaming experience. The GMU monitors the information that is input through the user interface 50. This provides a dramatic improvement over traditional system components (e.g., input/output peripherals, such as 2-line, 20 character VF (Vacuum Fluorescent) displays and 12-digit keypads) that have been used as in the past to acquire user information.

Referring back to FIG. 1, the game data repository 20 stores data for the various parameters relating to each component. The game repository 20 may be a non-volatile memory storage device such as, but not limited to, a hard drive, flash memory, or other solid-state, non-volatile memory such as, but not limited to EPROM, EEPROM, DRAM, or the like. As shown in FIG. 1, the game data repository 20 is in communication with each component within the gaming machine 10. Each gaming machine 12 also includes a dedicated game data repository 20. Alternatively, each gaming machine 12 may be in communication with a dedicated game data repository 20 that is separate from the gaming machine (not shown). In an alternate embodiment, the game data repository 20 and the GMU 14 are integral components (not shown).

In yet another embodiment, as shown in FIG. 2, a non-dedicated game data repository 32 is separate and apart from the gaming machines. That is, the non-dedicated repository 32 is in communication with the GMU 14, player tracking system 16, and other components 18 of one or more gaming machines 12. As those skilled in the art will appreciate, the game repositories 16, 32 may be interconnected to the GMU 14, the player tracking system 16, and various game components 18 by a USB connection, a broadband TCP/IP connection, a wireless network connection, or any other means for operatively coupling components together.

The game data repository 20 is capable of obtaining and/or receiving data from the GMU 14, the player tracking system 16, the embedded additional user interface 50, and other gaming components 18. The game data repository 20 also stores the data for later collection and use by the data collection system 10. The parameters (game data) stored in the repository 20 may include the make/model of the gaming component 14, 16, and 18, the component's hardware revision, the device's firmware revision, the physical location of the gaming device on the property, zoning of the gaming device (e.g., high roller zone), game type (e.g., mechanical, electrical, dual screen, and the like), the component's IP address, dynamic gaming state or state change (e.g., payout, malfunction, "game in use," offline, tilt, jackpot mode, turned off, authentication failure, security breach, downloading content, and installing content), or the like. The game data may also include coin-in meters, coin-out meters, player tracking information, or the like.

According to one embodiment, the game data repository 20, 32 has a record protocol that allows the repository to communicate with every component of the gaming machine 12. That is, the record protocol ensures compatibility across various platforms of the gaming components. As a result, game data is accessible to the repository 20, 32 that may not otherwise be obtainable by a remote system.

Referring back to FIG. 1, the data collection system 10 also includes a datastore 24 and a server 22 that is in communication with the gaming machines 12. Alternatively, the datastore 24 is an integral component of the server 22. In various embodiments of the system 10, the datastore 24 may comprise a relational database, object database, a flat file, an ASCII list, registry entries, an XML file, a "collection" (i.e., in a SQL (structured query language) environment, a collection of parameter defined data in an object database), or any other type of commonly known data listing. As those skilled in the art will appreciate, the server 22 is networked with the gaming machines 12 by a local area network, wide area network, wireless network, or any other network connection known or developed in the art. In another embodiment, the server 22 is connected with the gaming machines 12 by an Ethernet-networked backbone. For example, the Ethernet backbone may be a 10/100 base T Ethernet connection running over Cat 3, 4, 5, 6, or higher. Accordingly, a standard 10/100 base T Ethernet card is added to the gaming machine.

Because the device data resides on a central computer datastore 24, datastore searches (e.g., binary and the like) can be performed to produce specifically desired reports. For example, the datastore searches may be conducted by one or more parameters, by category (e.g., all $0.25 gaming machines), by time, or location (e.g., higher roller zone). According to one embodiment, the central computer 22 provides a standard list of selectable criteria for a datastore search. Alternatively, the casino operator may customize datastore searches for any information that is stored within the datastore.

However, in one embodiment, a distributed datastore 24 is used instead of a centralized datastore. In one particular example, an analyst may be interested in the effectiveness of one piece of content (content X) compared to another piece of content (content Y) in a particular brand of gaming machine. For example, the analyst may perform a datastore 24 query on the "coin-in" count on all Blazing 7's style gaming machines with embedded additional user interfaces 50 running content version X and content version Y. In this manner, the claimed invention enables specialty reporting, efficiency analysis, and gaming device management with a high level of organization and simplicity.

In another embodiment, the standard binary datastore 24 searches are performed to produce other specifically desired reports, such predictive analysis and yield management. In one embodiment, the yield management data includes projection data calculated based on one or more factors related to use of one or more gaming machines. For example, the yield management data includes game play projection data, machine usage projection data, and/or income projection, data calculated based historical game play data for the one or more gaming machines. In one embodiment, the calculations are performed using linear regression analysis. In another embodiment, the calculations are performed using a neural network. In one embodiment, yield management data is used to determine one or more bonuses.

One of ordinary skill in the art will appreciate that not all data collection systems 10 have all these components and may have other components in addition to, or in lieu of, those components mentioned here. Furthermore, while these components are viewed and described separately, various components may be integrated into a single unit in some embodiments.

Figure 4:
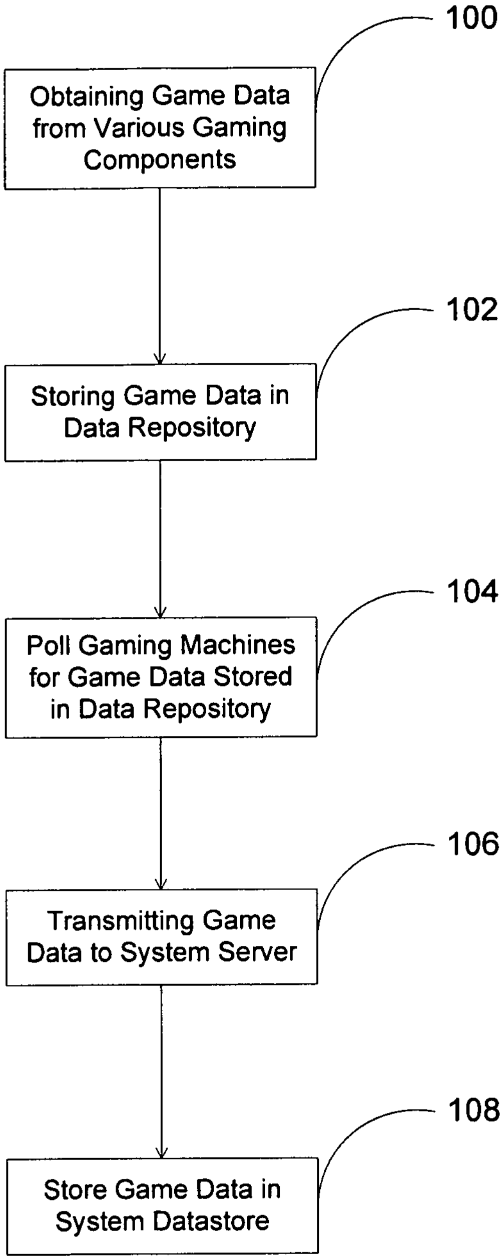
FIG. 4 is a flow diagram of one method of data collection from one or more gaming components.

In addition to various embodiments of a data collection system, various methods of managing and collecting data are disclosed herein. Referring now to FIG. 4, various parameters are collected from the various gaming components 14, 16, and 18 in step 100. According to one method, the game data repository 20 polls (or queries) each component 14, 16, and 18 in the gaming machine 12 to obtain information from each device. Alternatively, game data may be sent by the components 14, 16, and 18 to the game data repository 20. Regardless of the process, once the game data repository 20 receives the game data, it is stored within the game data repository in step 102. In one method, the game data from the components 14, 16, and 18 of the gaming machine 12 are stored in a single record. Otherwise stated, a single record represents the game data from all the components 14, 16, and 18 of the gaming machine 12. Alternatively, the game data from each component 14, 17, and 18 may be stored in separate records.

As shown in FIG. 4, the central server 22 polls, queries, or otherwise searches the game data repositories 20, 32 from each networked gaming machine 12 in step 104. For example, the central server 22 may target gaming machines 12 located in a high roller zone and search for information regarding the firmware version of each gaming machines' hopper. Alternatively, the central server 22 may search game data repositories 20, 32 for specific data such as coin-in values over $100. As those skilled in the art will appreciate, the casino operator may determine the time intervals at which the server 22 polls the game data repositories 20, 32. If game data is present in the game data repository 20 and 32, the game data is then transmitted to the system server 22 as shown in step 106. As shown in step 108, the game data may be stored within a central datastore 24 for future processing. That is, the datastore records may be mined by other software applications for a myriad of functions ranging from financial analysis to hardware location/inventory. In one method, the game data is time stamped when the game data from a particular gaming machine 12 is stored within the datastore 24. Alternatively, the game data may be time stamped when it is stored within the game data repository 20, 32. Datastores 24 that record software module descriptions and version may be useful for determining which software requires updating.

Figure 5:
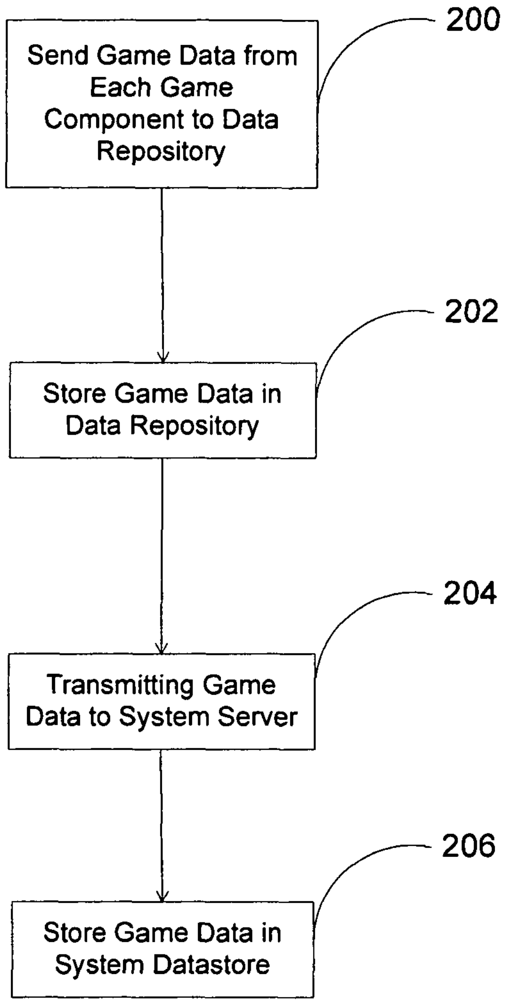
FIG. 5 is a flow diagram of another method of data collection from one or more gaming components.

According to the method shown in FIG. 5, in step 200, each component 14, 16, and 18 in the gaming machine 12 may periodically send game data to the game data repository 20, 32. The game data is then stored within the game data repository 20, 32 in step 202. The data is transmitted to the system server 22 in step 204. According to one method, the game data in the game data repository 20, 32 is transmitted to the system server 22 in response to a request for game data. Alternatively, the game data is periodically sent to the system server 22 without any prompting from the data collection system 10. Once the system server 22 receives the game data information from a gaming machine 12, the game data is stored in a system datastore 24 in step 206.

Optionally, in another method, the game data may be encrypted prior to transmission to the system server 22. The encryption process certifies that there is sufficient security for gaming regulators to audit and trace the game data sent to the data collection system. Additionally, the certification process ensures authentication and non-repudiation of the content of the game data sent to the data collection system.

In one embodiment, PKI (Public Key Infrastructure) is used in the certification process. PKI is a system of digital certificates, Certificate Authorities, and other registration authorities that verify authenticity and validity. In another embodiment, a "new tier" or derivative PKI is created that is rooted in the primary PKI and that leverages the capabilities of the certificate (e.g., a x509 certificate) that allow for limited access. This allows the attributes within the certificate to be used to provide "levels" of code access and acceptance in the gaming industry.

In another embodiment, the content is protected by digital signature verification using. DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds a trusted authority's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

Alternatively, a Secure Hash Function-1 (SHA-1), or better, is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number.

In another embodiment, the claimed invention uses a Message Authentication Code (MAC). A MAC is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A MAC is attached to data in order to allow data authentication. Further, a MAC may be used to simultaneously verify both the data integrity and the authenticity of a message. Typically, a MAC is a one-way hash function that takes as input both a symmetric key and some data. A symmetric-key algorithm is an algorithm for cryptography that uses the same cryptographic key to encrypt and decrypt the message.

A MAC can be generated faster than using digital signature verification technology; however, a MAC is not as robust as digital signature verification technology. Thus, when speed of processing is critical the use of a MAC provides an advantage, because it can be created and stored more rapidly than digital signature verification technology.

In yet another embodiment, the authentication technique used is a BKEY (electronic key) device. A BKEY is an electronic identifier that is tied to a particular trusted authority. In this manner, any adding, accessing, or modification of content that is made using a BKEY for authentication is linked to the specific trusted authority to which that BKEY is associated. Accordingly, an audit trail is thereby established for regulators and/or other entities that require this kind of data or system authentication.

Alternatively, "component bindings" may be used for cryptographic security. In component binding, some components come equipped with unalterable serial numbers. Additionally, components such as web content or the game cabinet may also be given another random identification number by the owner. Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1) using the key derived from the bindings. This signature is verified whenever an entry is made to a component within the binding. If the signature is wrong, this security violation and the violator are noted, but typically the entry is not prohibited. In other embodiments, the entry may be prohibited as well. Thus, the component binding produces a cryptographic audit trail of the trusted authority making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation, the cabinet, motherboard, specific software, non-volatile RAM card, content (data), and hard drive. These identification numbers combined in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the trusted authority making the change. In one embodiment, a specific level of BKEY clearance or classification is required to make specific changes.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A system for managing gaming devices in a networked environment, comprising:
- one or more gaming devices, wherein the gaming devices comprise:
  - a gaming processor;
  - a plurality of gaming hardware components, wherein the gaming hardware components are game monitoring units, player tracking user interfaces, bill dispensers, coin acceptors, hoppers, printers, or other embedded components, wherein one or more parameters are associated with the gaming hardware components, the one or more parameters being at least a name or location of the gaming hardware component, and a hardware revision of the gaming hardware component or a firmware revision of the gaming hardware component, and wherein the one or more parameters are component-related data and not accounting data or player data;
  - a data repository located within each gaming device, the data repository being in communication with the plurality of gaming hardware components, wherein the data repository is a non-volatile memory device, and wherein the data repository stores data that includes one or more parameters from each gaming hardware component;
- a host system in communication with the data repository, wherein the host system is configured to poll and collect data from the gaming hardware components by only accessing the data repository and not directly accessing the gaming hardware components, and the data stored in the data repository is searchable by the host system; and
- a datastore in communication with the host system, wherein the datastore stores the data from the one or more gaming devices.

2. The system of claim 1, wherein
- one gaming hardware component is an embedded additional user interface comprising a web-content capable display screen, wherein the display screen presents web information to a user via the display screen; and
- an embedded processor employs an internal operating system and communicates with the gaming processor, wherein the embedded processor reads incoming data, translates the data into a web protocol, if necessary, and maps the data to the web-content display screen.

3. The system of claim 1, wherein one parameter associated with each gaming hardware component further includes contents of the gaming hardware component, a make of the gaming hardware component, a model of the gaming hardware component, application logs, access logs, other component-related data, IP address, or other identifiable criteria.

4. A system for managing gaming devices in a networked environment, the system comprising:
- one or more gaming devices, wherein the gaming devices comprise a gaming processor and a plurality of gaming hardware components, wherein one or more parameters are associated with the gaming hardware components, wherein the one or more parameters are a name of the gaming component, a hardware revision of the gaming component, a firmware revision of the gaming component, contents of the gaming component, a make of the gaming component, a model of the gaming component, application logs, access logs, or other component-related data, and wherein the one or more parameters are not accounting data or player data;
- at least one data repository in communication with the plurality of gaming hardware components, wherein the data repository is located within each gaming device and the data repository is a non-volatile memory device, wherein the data repository queries the plurality of gaming hardware components for data and the data repository stores data that includes one or more parameters from each gaming hardware component;
- a host system in communication with the data repository, the host system being configured to only request data from the data repository and not directly accessing the gaming hardware components, the host system configured to identify gaming devices having one or more gaming hardware components based on a search of one or more parameters stored in the data repository; and
- a datastore in communication with the host system, wherein the datastore stores the data from the one or more gaming devices, and the data stored in the datastore comprises at least a name or location of the gaming hardware component, and a hardware revision of the gaming hardware component or a firmware revision of the gaming hardware component.

5. The system of claim 4, wherein the data repository is in communication with the one or more gaming devices, and the data repository stores data from the one or more gaming devices.

6. The system of claim 4, wherein the gaming hardware components are game monitoring units, player tracking user interfaces, bill dispensers, coin acceptors, hoppers, printers, or other embedded components.

7. The system of claim 4, wherein
- one gaming hardware component is an embedded additional user interface comprising a web-content capable display screen, wherein the display screen presents web information to a user via the display screen; and
- an embedded processor employs an internal operating system and communicates with the gaming processor, wherein the embedded processor reads incoming data, translates the data into a web protocol, if necessary, and maps the data to the web-content display screen.

8. A system for managing gaming devices in a networked environment, the system comprising:
- a plurality of gaming devices in communication with a host system, wherein the gaming devices comprise:
  - a game processor;
  - a plurality of gaming hardware components, wherein the gaming hardware components are game monitoring units, player tracking user interfaces, bill dispensers, coin acceptors, hoppers, printers, or other embedded components;
  - a gaming device repository for storing component-related data from the game processor and the plurality of gaming components, the gaming device repository being a non-volatile memory device, wherein the component-related data is not accounting data or player data, and the component-related data comprises at least a name or location of the gaming hardware component, and a hardware or firmware revision of the gaming hardware component and the gaming device repository queries the game processor and the plurality of gaming hardware components for data; and the host system, includes at least one server for requesting data from the gaming device repository and capable of identifying gaming devices having one or more gaming hardware components based upon the data requested from the gaming devices, wherein the host system only queries the gaming device repository and not each gaming hardware component.

9. The system of claim 8, further comprising a datastore in communication with the host system.

10. The system of claim 9, wherein the host system transfers data from the data repository to the datastore.

11. The system of claim 10, wherein the host system targets and transfers data regarding one or more parameters from the data repository to the datastore.

12. The system of claim 11, wherein the parameter further includes contents of the gaming hardware component, a make of the gaming hardware component, a model of the gaming hardware component, application logs, access logs, other component-related data, IP address, or other identifiable criteria.

* * * * *